US012798970B2

(12) United States Patent
Karube et al.

(10) Patent No.: US 12,798,970 B2
(45) Date of Patent: Nov. 17, 2026

(54) ZIRCONIUM-CONTAINING NITRIDE POWDER AND ULTRAVIOLET RAY-CURABLE BLACK ORGANIC COMPOSITION

(71) Applicant: MITSUBISHI MATERIALS CORPORATION, Tokyo (JP)

(72) Inventors: Masaya Karube, Naka (JP); Tasuku Sugiura, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 812 days.

(21) Appl. No.: 18/031,499

(22) PCT Filed: Oct. 29, 2021

(86) PCT No.: PCT/JP2021/040057
§ 371 (c)(1),
(2) Date: Apr. 12, 2023

(87) PCT Pub. No.: WO2022/092274
PCT Pub. Date: May 5, 2022

(65) Prior Publication Data

US 2023/0382733 A1 Nov. 30, 2023

(30) Foreign Application Priority Data

Nov. 2, 2020 (JP) ................................ 2020-183603

(51) Int. Cl.
*C01B 21/076* (2006.01)
*C08K 3/11* (2018.01)

(52) U.S. Cl.
CPC .............. *C01B 21/076* (2013.01); *C08K 3/11* (2018.01); *C01P 2004/64* (2013.01); *C01P 2006/60* (2013.01); *C08K 2201/005* (2013.01); *C08K 2201/011* (2013.01)

(58) Field of Classification Search
None
See application file for complete search history.

(56) References Cited

U.S. PATENT DOCUMENTS

| | | | | |
|---|---|---|---|---|
| 6,719,837 | B2 * | 4/2004 | Bertaux | C09C 1/0021 106/419 |
| 2019/0071318 | A1 | 3/2019 | Kaner et al. | |
| 2020/0156943 | A1 | 5/2020 | Kageyama et al. | |
| 2021/0087404 | A1 | 3/2021 | Watanabe et al. | |
| 2021/0115219 | A1 | 4/2021 | Noue et al. | |

FOREIGN PATENT DOCUMENTS

| | | | |
|---|---|---|---|
| CN | 107777673 | A | 3/2018 |
| JP | 2018-203599 | A | 12/2018 |
| JP | 2019-112275 | A | 7/2019 |
| TW | 201915068 | A | 4/2019 |
| WO | 2019/059359 | A1 | 3/2019 |
| WO | 2019/124100 | A1 | 6/2019 |

OTHER PUBLICATIONS

Perez-Estebanez et al("Inorganic pigments based on fluorite-type oxynitrides", J. Mater. Res., vol. 21, No. 5, (2006) pp. 1427-1433). (Year: 2006).*

N. J. Martinez Meta et al., "Zr50Sc12O43N50 and Zr3Sc4N8—Synthesis, Neutron Powder Diffraction and Raman Spectroscopy," Zeitschrift fur Anorganische und Allgemeine Chemie., Apr. 10, 2007, vol. 633, pp. 790-794.

K. Yamasaki et al., "Fabrication of Lanthanide Nitride Pellets and Simulated Burnup Fuels," Proceedings of the Symposium on Nitride Fuel Cycle Technology, Jul. 28, 2004, JAERI-Conf 2004-015, pp. 43-48 and informration sheets.

S. Meyer et al., "Synthesis and Crystal Structure of a Bixbyite-Type Solid Solution Zr0.43Er0.57O1.07N0.43," Zeitschrift fur Anorganische und Allgemeine Chemie., Jul. 31, 2009, vol. 635, pp. 2470-2473.

M. Yang et al., Direct Solid-State Synthesis at High Pressures of New Mixed-Metal Oxynitrides: RZrO2N (R=Pr, Nd, and Sm), Inorganic Chemistry, Nov. 13, 2009, vol. 48, pp. 11498-11500.

International Search Report mailed Dec. 14, 2021, issued for PCT/JP2021/040057 and English translation thereof.

Pérez-Estébanez M. et al: "Inorganic pigments based on fluorite-type oxynitrides", Journal of Materials Research, vol. 21, No. 6, Jun. 1, 2006, pp. 1427-1433.

Martinez Meta N.J. et al: "Zirconium scandium oxide nitrides: Formation and decomposition followed in situ by XRD and thermal analysis", Journal of Solid State Chemistry, vol. 179, No. 5, May 1, 2006, pp. 1486-1489.

Xie, Rong-Jun et al: "Optical Properties of (Oxy)Nitride Materials: A Review", Journal of the American Ceramic Society, vol. 96, No. 3, Mar. 1, 2013, pp. 665-687.

Gutzov S. et al: "Optical properties of europium containing zirconium oxynitrides", Optical Materials, vol. 24, No. 3, Dec. 1, 2003, pp. 547-554.

Supplementary European Search Report mailed Mar. 28, 2025, issued for EP21886391.8.

1 Office Action mailed May 9, 2025, issued for CN202180072961.1 and English translation of Search Report.

Notice of Allowance mailed May 1, 2025, issued for TW110140530 and an English translation of the Search Report.

* cited by examiner

*Primary Examiner* — Michael Forrest
(74) *Attorney, Agent, or Firm* — Troutman Pepper Locke LLP

(57) ABSTRACT

This zirconium-containing nitride powder has a composition represented by the following General Formula (I). (Zr, X, Y) (N, O) . . . (I). In General Formula (I), X represents at least one element selected from the group consisting of Dy, Er, Gd, Ho, Lu, Nd, Pr, Sc, Sm, Tb, and Tm, Y represents an element symbol of yttrium, an amount of Y is 0 mol or greater with respect to 1 mol of a total amount of Zr, X, and Y, N represents nitrogen, O represents oxygen, and an amount of oxygen is 0 mol or greater with respect to 1 mol of a total amount of nitrogen and oxygen.

12 Claims, 3 Drawing Sheets

ZIRCONIUM-CONTAINING NITRIDE POWDER AND ULTRAVIOLET RAY-CURABLE BLACK ORGANIC COMPOSITION

TECHNICAL FIELD

The present invention relates to zirconium-containing nitride powder and an ultraviolet ray-curable black organic composition.

The present application claims priority on Japanese Patent Application No. 2020-183603 filed on Nov. 2, 2020, the content of which is incorporated herein by reference.

BACKGROUND ART

Insulating black pigments are used, for example, as materials for black patterns that constitute black matrices of a color filter for display and light shielding materials in CMOS camera modules. As a method for forming a black pattern, a photolithography method using a black photosensitive composition including an ultraviolet ray-curable organic material and an insulating black pigment, is known. In the photolithography method, a black photosensitive composition is coated on a substrate to form a photoresist film. Next, the photoresist film is exposed to ultraviolet light in a pattern; and thereby, a pattern is produced which includes a cured portion that is exposed to ultraviolet light and cured and an uncured portion that is not exposed to the ultraviolet light. Then, the uncured portion is removed to form a black pattern. The insulating black pigment, which is used when the black pattern is formed by the photolithography method, is required to transmit the ultraviolet light that cures the photoresist film, that is, to have ultraviolet light transmittance.

As the insulating black pigment having ultraviolet light transmittance, zirconium nitride powder is known. In order to improve the ultraviolet light transmittance of zirconium nitride powder, addition of magnesium and/or aluminum to zirconium nitride has been studied (Patent Document 1).

In accordance with recent increase in resolution of displays and reduction in size of CMOS camera modules, there is a demand for higher definition of black patterns. In order to form high-definition black patterns using a photolithography method, it is necessary to improve ultraviolet light transmittance of black pigments, particularly, to improve transmittance of ultraviolet light (i rays) at a wavelength of 365 nm, which is commonly used in an ultraviolet light exposure device. However, when the ultraviolet light transmittance of the black pigment is improved, visible light shielding properties may be lowered.

PRIOR ART DOCUMENTS

Patent Document

Patent Document 1: Japanese Unexamined Patent Application, First Publication No. 2019-112275

DISCLOSURE OF INVENTION

Problems to be Solved by the Invention

The present invention has been made in view of the circumstances described above, and an object of the present invention is to provide powder having excellent ultraviolet light transmittance and visible light shielding properties.

Solutions for Solving the Problems

In order to solve the above-described problems, there is provided zirconium-containing nitride powder according to a first aspect of the present invention, which has a composition represented by the following General Formula (I), $$(Zr, X, Y)\ (N, O) \quad (I)$$

in General Formula (I), X represents at least one element selected from the group consisting of Dy, Er, Gd, Ho, Lu, Nd, Pr, Sc, Sm, Tb, and Tm, Y represents an element symbol of yttrium, an amount of Y is 0 mol or greater with respect to 1 mol of a total amount of Zr, X, and Y, N represents nitrogen, O represents oxygen, and an amount of oxygen is 0 mol or greater with respect to 1 mol of a total amount of nitrogen and oxygen.

Since the zirconium-containing nitride powder having the above-described configuration has the composition represented by General Formula (I), a wavelength at which the maximum peak of the extinction coefficient in a visible light region is exhibited can be within a range of 540 nm or greater and 600 nm or less. Therefore, visible light from a short wavelength side (for example, wavelength of 400 nm) to a long wavelength side (for example, wavelength of 800 nm) can be shielded. Therefore, the zirconium-containing nitride powder having the above-described configuration has excellent ultraviolet light transmittance and visible light shielding properties.

In the zirconium-containing nitride powder according to the first aspect of the present invention, it is preferable that an average particle size is within a range of 10 nm or greater and 70 nm or less.

In this case, since the zirconium-containing nitride powder has an average particle size within the above-described range and is fine, plasma oscillation of zirconium-containing nitride particles due to visible light is less likely to be attenuated. Therefore, the visible light shielding properties are improved. In addition, since the particle size is sufficiently small with respect to the wavelength of light, light scattering is less likely to occur; and thereby, ultraviolet light transmittance at a wavelength of 365 nm is improved.

Further, in the zirconium-containing nitride powder according to the first aspect of the present invention, it is preferable that in extinction coefficients measured by the following method, a ratio of an extinction coefficient of visible light at a wavelength of 550 nm to an extinction coefficient of ultraviolet light at a wavelength of 365 nm is within a range of 1.4 or greater and 100 or less.

(Method for Measuring Extinction Coefficient)

A dispersion containing the zirconium-containing nitride powder at a mass concentration of 50 ppm is put into a cell having an optical path length d (unit: m). The cell containing the dispersion is irradiated with light to measure transmission light intensity of the light transmitted through the cell. $\alpha$ is calculated as an extinction coefficient of the light irradiated into the cell by substituting the optical path length d, incident light intensity $I_0$ of the light irradiated into the cell, and transmission light intensity I of the light transmitted through the cell into the following Equation (1).

$$I = I_0 \exp(-\alpha \times d) \quad (1)$$

In this case, since the ratio of the extinction coefficient of visible light at the wavelength of 550 nm to the extinction coefficient of ultraviolet light at the wavelength of 365 nm is within a range of 1.4 or greater and 100 or less, the ultraviolet light transmittance and the visible light shielding properties are improved in a well-balanced manner. Therefore, when the zirconium-containing nitride powder having the above-described configuration is used, it is possible to form a black pattern having high definition and excellent visible light shielding properties.

Further, in the zirconium-containing nitride powder according to the first aspect of the present invention, it is preferable that the extinction coefficient of visible light at the wavelength of 550 nm is equal to or greater than 600 $m^{-1}$.

In this case, since the extinction coefficient of visible light at the wavelength of 550 nm is equal to or greater than 600 $m^{-1}$, the visible light shielding properties are further improved. Therefore, the black pattern formed using the zirconium-containing nitride powder having the above-described configuration is useful as a black matrix of color filters for display and a light shielding material in CMOS camera modules.

Further, zirconium-containing nitride powder according to a second aspect of the present invention has an average particle size within a range of 10 nm or greater and 70 nm or less, wherein in extinction coefficients measured by the following method, a ratio of an extinction coefficient of visible light at a wavelength of 550 nm to an extinction coefficient of ultraviolet light at a wavelength of 365 nm is within a range of 1.4 or greater and 100 or less.

(Method for Measuring Extinction Coefficient)

A dispersion containing the zirconium-containing nitride powder at a mass concentration of 50 ppm is put into a cell having an optical path length d (unit: m). The cell containing the dispersion is irradiated with light to measure transmission light intensity of the light transmitted through the cell. α is calculated as an extinction coefficient of the light irradiated into the cell by substituting the optical path length d, incident light intensity $I_0$ of the light irradiated into the cell, and transmission light intensity I of the light transmitted through the cell into the following Equation (1).

$$I=I_0\exp(-\alpha\times d) \quad (1)$$

According to the zirconium-containing nitride powder having the above-described configuration, since the average particle size is within the above-described range and is fine, the plasma oscillation of the zirconium-containing nitride particles due to visible light is less likely to be attenuated. Therefore, the visible light shielding properties are improved. In addition, since the particle size is sufficiently small with respect to the wavelength of light, light scattering is less likely to occur; and thereby, ultraviolet light transmittance at a wavelength of 365 nm is improved. Furthermore, since the ratio of the extinction coefficient of visible light at the wavelength of 550 nm to the extinction coefficient of ultraviolet light at the wavelength of 365 nm, which is measured by the above-described method, is within a range of 1.4 or greater and 100 or less, the ultraviolet light transmittance and the visible light shielding properties are improved in a well-balanced manner. Therefore, when the zirconium-containing nitride powder having the above-described configuration is used, it is possible to form a black pattern having high definition and excellent visible light shielding properties.

An ultraviolet ray-curable black organic composition according to a third aspect of the present invention includes: an ultraviolet ray-curable organic material; and a black pigment dispersed in the ultraviolet ray-curable organic material, in which the black pigment is the zirconium-containing nitride powder according to the first and second aspects of the present invention.

In the ultraviolet ray-curable black organic composition according to the third aspect of the present invention, it is preferable that the ultraviolet ray-curable organic material is at least one organic material selected from the group consisting of an acrylic monomer, an acrylic oligomer, an epoxy monomer, and an epoxy oligomer.

Effects of Invention

According to the first and second aspects of the present invention, it is possible to provide powder having excellent ultraviolet light transmittance and visible light shielding properties.

According to the third aspect of the present invention, it is possible to provide an ultraviolet ray-curable black organic composition having excellent ultraviolet light transmittance and visible light shielding properties.

EMBODIMENTS FOR CARRYING OUT THE INVENTION

Figure 1:
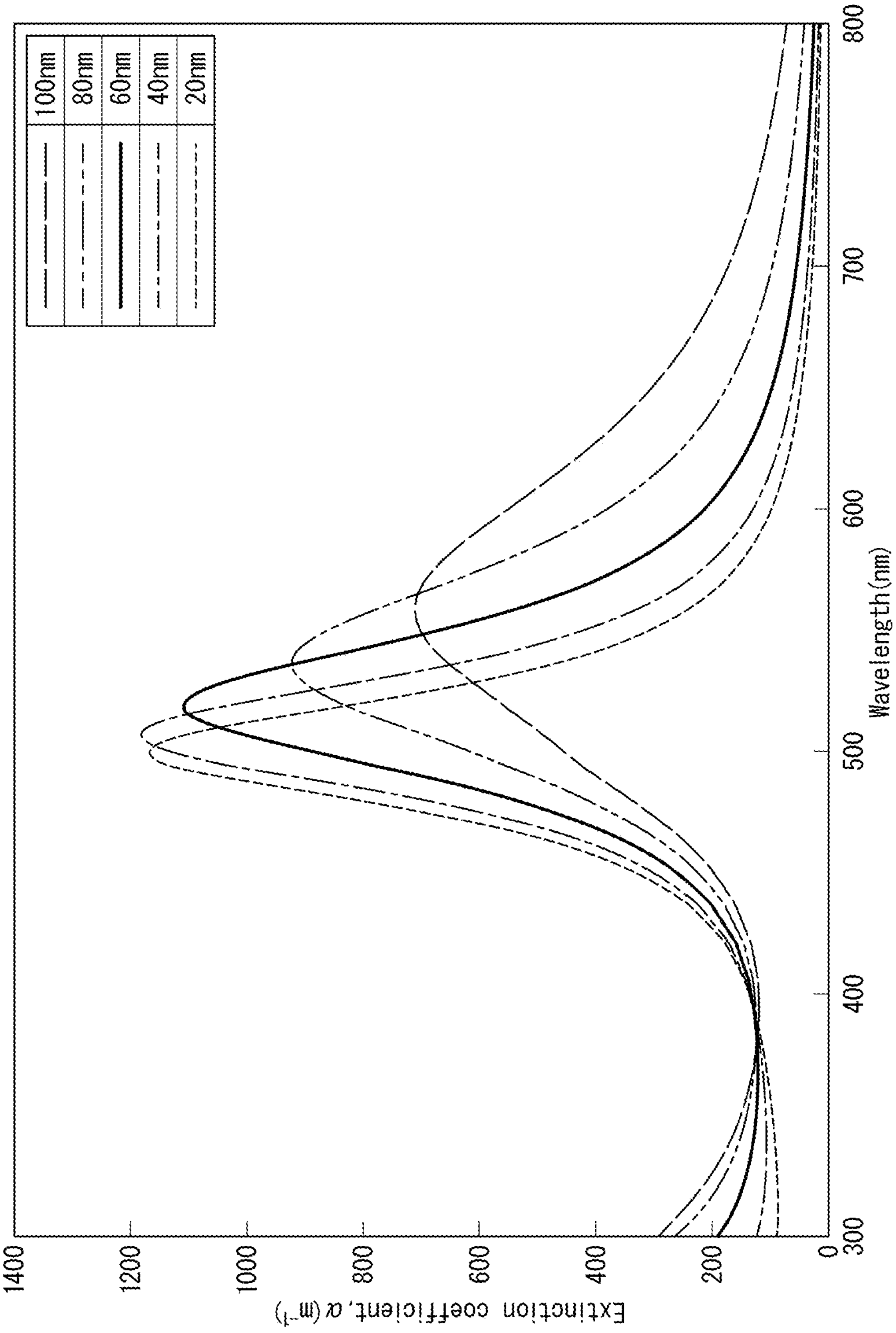
FIG. 1 shows wavelength-extinction coefficient curves of five zirconium nitride powders each having an average particle size of 20 nm, 40 nm, 60 nm, 80 nm, or 100 nm, which are calculated in Test Example 1.

Zirconium-containing nitride powder according to one embodiment of the present invention will be described below.

The zirconium-containing nitride powder of the present embodiment is black powder that is used, for example, as a material for black patterns that constitute black matrices of a color filter for display and light shielding materials in CMOS camera modules. For example, the black pattern is formed by a photolithography method using an ultraviolet ray-curable black organic composition including the zirconium-containing nitride powder according to the present embodiment and an ultraviolet ray-curable organic material.

(Zirconium-Containing Nitride Powder)

The zirconium-containing nitride powder of the present embodiment has an average particle size within a range of 10 nm or greater and 70 nm or less. Since the zirconium-containing nitride powder has an average particle size within the above-described range and is fine, plasma oscillation of zirconium-containing nitride particles due to visible light is less likely to be attenuated. Therefore, the visible light shielding properties are improved. In addition, since the particle size is sufficiently small with respect to the wavelength of light, light scattering is less likely to occur; and thereby, transmittance of ultraviolet light (i rays) at a wavelength of 365 nm, which is generally used in an ultraviolet light exposure device, is enhanced. However, if the average particle size of the zirconium-containing nitride powder becomes too small, a wavelength of plasmon resonance becomes too short, and a position of an extinction coefficient peak in the visible light region may shift excessively to the short wavelength side. When the position of the extinction coefficient peak in the visible light region shifts excessively to the short wavelength side, the extinction coefficient of visible light on the long wavelength side may decrease, and shielding properties of visible light on the long wavelength side may decrease. Therefore, the zirconium-containing nitride powder of the present embodiment has an average particle size within a range of 10 nm or greater and 70 nm or less. The zirconium-containing nitride powder preferably has an average particle size within a range of 20 nm or greater and 70 nm or less, and particularly preferably within a range of 30 nm or greater and 60 nm or less.

The average particle size of the zirconium-containing nitride powder is a BET size and is measured by the following method.

Nitrogen molecules are adsorbed on particle surfaces of the zirconium-containing nitride powder at a temperature of liquid nitrogen, and an adsorption isotherm (adsorption amount) thereof is measured. A BET plot is created and a monomolecular layer adsorption amount of nitrogen molecules is determined using a BET equation. Then, a specific surface area of zirconium-containing nitride powder particles is calculated from the monomolecular layer adsorption amount of nitrogen molecules. Assuming that the zirconium-containing nitride powder particles are spherical, the BET size is calculated by the following equation from the specific surface area (BET specific surface area) measured by a BET single-point method.

BET size=6/(density×BET specific surface area)

The BET size in the present specification was measured using Macsorb HM model-1210 manufactured by MOUNTECH Co., Ltd.

The zirconium-containing nitride powder of the present embodiment has a composition represented by the following General Formula (I), $$(Zr, X, Y)\ (N, O) \qquad (I)$$

In General Formula (I), X represents at least one element selected from the group consisting of Dy, Er, Gd, Ho, Lu, Nd, Pr, Sc, Sm, Tb, and Tm. Y represents an element symbol of yttrium, and an amount of Y is 0 mol or greater with respect to 1 mol of a total amount of Zr, X, and Y. N represents nitrogen. O represents oxygen, and an amount of oxygen is 0 mol or greater with respect to 1 mol of a total amount of nitrogen and oxygen. A total number of moles of Zr, X, and Y is the same as a total number of moles of N and O in 1 mol of the zirconium-containing nitride powder.

General Formula (I) represents the entire composition of the zirconium-containing nitride powder, the zirconium-containing nitride powder may be a single phase of nitride or oxynitride, or may be any of a mixture of nitride and oxide, a mixture of oxynitride and oxide, a mixture of nitride and oxynitride, and a mixture of nitride, oxynitride, and oxide.

In General Formula (I), all of the elements represented by X are group 3 elements. The element represented by X has an effect of shifting the wavelength at which the maximum peak of the extinction coefficient is obtained in the visible light region of the zirconium-containing nitride powder to the long wavelength side. One of the elements represented by X may be used or a combination of two or greater thereof may also be used. Preferred elements among the elements represented by X are Dy, Er, Ho, and Tm. The amount of the element represented by X is preferably within a range of mol or greater and 0.30 mol or less when the total amount of zirconium, the element represented by X, and yttrium is 1 mol. When the amount of the element represented by X is within this range, the wavelength at which the maximum peak of the extinction coefficient is obtained in the visible light region can be maintained within a range of 540 nm or greater and 600 nm or less. The amount of the element represented by X is more preferably within a range of 0.07 mol or greater and 0.25 mol or less, and particularly preferably within a range of 0.10 mol or greater and 0.20 mol or less.

When the zirconium-containing nitride powder of the present embodiment does not contain yttrium, the composition thereof is preferably represented by the following General Formula (II).

$$Zr_{1-a}X_aN_{1-c}O_c \qquad (II)$$

In General Formula (II), X is the same as that in General Formula (I). a represents a number within a range of 0.05 or greater and 0.30 or less. a is more preferably within a range of 0.07 or greater and 0.25 or less, and particularly preferably within a range of 0.10 or greater and 0.20 or less.

c is preferably within a range of 0 or greater and 0.5 or less, more preferably within a range of 0 or greater and 0.45 or less, and particularly preferably within a range of 0 or greater and 0.4 or less.

An amount of metal elements (including Y, which will be described later) in the zirconium-containing nitride powder is measured by X-ray photoelectron spectroscopy. An amount of nitrogen in the zirconium-containing nitride powder is measured by an inert gas fusion-thermal conductivity method. An amount of oxygen (c in General Formula (II)) in the zirconium-containing nitride powder is measured by a method conforming to JIS Z2613 "General Rules for Determination of Oxygen in Metal Materials".

The zirconium-containing nitride powder of the present embodiment may further contain yttrium (Y). In this case, the composition of the zirconium-containing nitride powder is preferably represented by the following General Formula (III).

$$Zr_{1-a-b}X_aY_bN_{1-c}O_c \ (III)$$

When the total amount of zirconium, the element represented by X, and Y is 1 mol, the amount of Y (b in General Formula (III)) is preferably within a range of 0.05 mol or greater and 0.30 mol or less, more preferably within a range of 0.07 mol or greater and mol or less, and particularly preferably within a range of 0.10 mol or greater and 0.20 mol or less. The numerical ranges of a and c in General Formula (III) are the same as the numerical ranges of a and c in General Formula (II).

In the zirconium-containing nitride powder of the present embodiment, a ratio ($\alpha_{550}/\alpha_{365}$) of an extinction coefficient $\alpha_{550}$ of visible light at a wavelength of 550 nm to an extinction coefficient $\alpha_{365}$ of ultraviolet light at a wavelength of 365 nm is within a range of 1.4 or greater and 100 or less. When the ratio ($\alpha_{550}/\alpha_{365}$) is within this range, the ultraviolet light transmittance and the visible light shielding properties are improved in a well-balanced manner. The ratio ($\alpha_{550}/\alpha_{365}$) is more preferably within a range of 2 or greater and 80 or less, and particularly preferably within a range of 2.5 or greater and 60 or less.

The extinction coefficient $\alpha_{550}$ of visible light at a wavelength of 550 nm is preferably 600 $m^{-1}$ or greater, more preferably 700 $m^{-1}$ or greater, and particularly preferably 750 $m^{-1}$ or greater. The extinction coefficient $\alpha_{550}$ may be 1,000 $m^{-1}$ or less.

The extinction coefficient $\alpha_{365}$ of ultraviolet light at a wavelength of 365 nm is preferably 300 $m^{-1}$ or less, more preferably 250 $m^{-1}$ or less, and particularly preferably 200 $m^{-1}$ or less. The extinction coefficient $\alpha_{365}$ may be 1 $m^{-1}$ or greater.

The extinction coefficient is a rate at which intensity of light transmitted through a dispersion containing the zirconium-containing nitride powder is attenuated with distance due to scattering and absorption of the light by zirconium-containing nitride particles in the dispersion. In the present embodiment, the extinction coefficient of the zirconium-containing nitride powder is a value measured by the following method.

A dispersion containing zirconium-containing nitride powder at a mass concentration of 50 ppm is put into a cell having an optical path length d (unit: m). The cell containing the dispersion is irradiated with light to measure transmission light intensity of the light transmitted through the cell. α is calculated as an extinction coefficient of the light irradiated into the cell by substituting the optical path length d, incident light intensity $I_0$ of the light irradiated into the cell, and transmission light intensity I of the light transmitted through the cell into the following Equation (1).

$$I=I_0\exp(-\alpha\times d) \quad (1)$$

The zirconium-containing nitride powder of the present embodiment can be produced, for example, by the following first production method and second production method.

First Production Method>

First, a zirconium dioxide powder (raw material oxide powder) containing X element oxide and Y oxide is prepared which includes an oxide powder of the element (X element) represented by X in General Formula (I), an oxide powder of yttrium, and a zirconium dioxide ($ZrO_2$) powder.

As the zirconium dioxide powder, for example, powders of monoclinic zirconium dioxide, cubic zirconium dioxide, yttrium-stabilized zirconium dioxide, and the like can be used. Among these zirconium dioxide powders, monoclinic zirconium dioxide powder is preferable from the viewpoint of increasing a production rate of the zirconium nitride powder. The zirconium dioxide powder preferably has an average primary particle size within a range of 10 nm or greater and 500 nm or less. The reason why the preferred average primary particle size of the zirconium dioxide powder is within the above-described range is as follows. When the average primary particle size is less than 10 nm, a particle size of zirconium-containing nitride obtained by the reaction becomes too small, and visible light shielding properties may deteriorate. On the other hand, when the average primary particle size exceeds 500 nm, the particle size of zirconium-containing nitride obtained by the reaction becomes too large, and visible light shielding properties may deteriorate.

The X element oxide powder preferably has an average primary particle size of nm or greater and 500 nm or less. The reason why the preferred average primary particle size of the X element oxide powder is within the above-described range is as follows. When the average primary particle size is less than 10 nm, a particle size of zirconium-containing nitride obtained by the reaction becomes too small, and visible light shielding properties may deteriorate. On the other hand, when the average primary particle size exceeds 500 nm, the particle size of zirconium-containing nitride obtained by the reaction becomes too large, and visible light shielding properties may deteriorate.

As the oxide powder of yttrium, powders of yttrium-stabilized zirconium dioxide and yttrium oxide ($Y_2O_3$) can be used. The yttrium-stabilized zirconium dioxide is also the zirconium dioxide powder described above. An average primary particle size of the oxide powder of yttrium is preferably 1000 nm or less, and more preferably 10 nm or greater and 500 nm or less from the viewpoint of easy handling of the powder.

When producing a yttrium-free zirconium-containing nitride, no oxide powder of yttrium is added.

The average primary particle sizes of the zirconium dioxide powder, the X element oxide powder, and the oxide powder of yttrium are converted value (BET size) calculated by spherical conversion from a measured value of the specific surface area measured by a BET method.

The zirconium dioxide powder (raw material oxide powder) containing the X element oxide and Y oxide can be obtained, for example, by mixing the X element oxide powder, the oxide powder of yttrium, and the zirconium dioxide powder. In addition, zirconium dioxide powder containing X element oxide and Y oxide can also be obtained by the following method. An aqueous solution containing an inorganic salt or organic salt of zirconium, an inorganic salt or organic salt of the X element, and an inorganic salt or organic salt of yttrium are alkalinized; and thereby, hydroxide of the X element, yttrium hydroxide, and zirconium hydroxide are co-precipitated. The obtained co-precipitate product is recovered, dried, and sintered.

Next, in a nitrogen-containing gas atmosphere, the zirconium dioxide powder (raw material oxide powder) containing the X element oxide and the Y oxide, and either one or both of a magnesium oxide powder and a magnesium nitride powder are mixed with a metallic magnesium powder to prepare a mixed powder. As the nitrogen-containing gas, for example, $N_2$ gas, a mixture gas of $N_2$ and Ar, a mixture gas of $N_2$ and $H_2$, or a mixture gas of $N_2$ and $NH_3$ can be used.

The magnesium oxide powder and the magnesium nitride powder have an effect of preventing sintering of zirconium nitride produced by sintering the mixed powder. The magnesium oxide powder and the magnesium nitride powder have an average primary particle size of preferably 1000 nm or less, and particularly preferably 10 nm or greater and 500 nm or less from the viewpoint of easy handling of the powder. The average primary particle size is a converted value calculated by spherical conversion from a measured value of the specific surface area measured by the BET method. The total amount of magnesium atoms in magnesium oxide and magnesium nitride is preferably within a range of 0.3 times mol or greater and 3.0 times mol or less, and more preferably within a range of 0.4 times mol or greater and 2.0 times mol or less with respect to 1 mol of a total amount of zirconium, the X element, and yttrium. The reason why the addition amounts of magnesium oxide and magnesium nitride are preferably within the above-described range is as follows. When the total amount of magnesium atoms in magnesium oxide and magnesium nitride is less than 0.3 times mot, an effect of preventing sintering of the zirconium nitride powder may be insufficient. On the other hand, when the total amount of magnesium atoms in magnesium oxide and magnesium nitride exceeds 3.0 times mol, the amount of an acid solution required for acid washing after sintering may increase.

The metallic magnesium powder has an effect of promoting the reduction of the X element oxide, the oxide powder of yttrium, and the zirconium dioxide to facilitate the formation of the zirconium-containing nitride. When the particle size of the metallic magnesium powder is too small, the reaction proceeds rapidly; and thereby, operational risk may be increased. For this reason, the metallic magnesium powder has a particle size of preferably 100 μm or greater and 1000 μm or less, and particularly preferably 200 μm or greater and 500 μm or less, when passing through a sieve. However, even if all the particle sizes of metallic magnesium are not within the above-described range, 80 mass % or greater, particularly 90 mass % or greater of the particles may be within the above-described range. When the addition amount of metallic magnesium is too small, the desired zirconium nitride powder may be difficult to obtain due to insufficient reduction. On the other hand, when the addition amount of metallic magnesium is too large, a reaction temperature rises rapidly due to excess metallic magnesium, and this may cause particle growth of the powder and is uneconomical. The addition amount of the metallic magnesium powder is preferably within a range of 2.0 times mol or greater and 6.0 times mol or less, and more preferably within a range of 3.0 times mol or greater and times mol or less with respect to 1 mole of a total amount of zirconium, the X element, and yttrium. The reason why the preferred addition amount of metallic magnesium is within the above-described range is as follows. When the addition amount of metallic magnesium is less than 2.0 times mol, the reducing power to reduce zirconium dioxide may be insufficient. On the other hand, when the addition amount of metallic magnesium exceeds 6.0 times mol, a reaction temperature rises rapidly due to excess metallic magnesium, and this may cause particle growth of the powder and may be uneconomical.

Next, the mixed powder is sintered in a nitrogen-containing gas atmosphere to reduce the X element oxide, the oxide of yttrium, and zirconium dioxide and cause nitriding reaction; and thereby, the zirconium-containing nitride powder is produced.

As the nitrogen-containing gas, for example, $N_2$ gas, a mixture gas of $N_2$ and Ar, a mixture gas of $N_2$ and $H_2$, or a mixture gas of $N_2$ and $NH_3$ can be used. The $N_2$ gas serves to react with the X element oxide, the oxide of yttrium, and zirconium dioxide to produce zirconium-containing nitride powder, and serves to prevent contact between metallic magnesium or zirconium-containing nitride powder and oxygen; and thereby, oxidation is suppressed. In addition, $H_2$ gas or $NH_3$ gas serves to reduce zirconium dioxide together with metallic magnesium. The concentration of $H_2$ gas in the mixture gas of $N_2$ and $H_2$ is preferably within a range of greater than 0% by volume and 40% by volume or less, and more preferably within a range of 10% by volume or greater and 30% by volume or less. In addition, the concentration of $NH_3$ gas in the mixture gas of $N_2$ and $NH_3$ is preferably within a range of greater than 0% by volume and 50% by volume or less, and more preferably within a range of 0% by volume or greater and 40% by volume or less. In the case where the nitrogen-containing gas having the reducing power is used, it is possible to finally produce zirconium nitride (zirconium-containing nitride) powder that does not contain low zirconium oxide and low zirconium oxynitride. On the other hand, when the concentration of $H_2$ gas in the mixture gas of $N_2$ and $H_2$ and the concentration of $NH_3$ gas in the mixture gas of $N_2$ and $NH_3$ are too high, the reduction proceeds, but the nitrogen source decreases, and thus low zirconium oxide or low zirconium oxynitride may be produced. In addition, the reason why $NH_3$ gas has a higher maximum concentration (the upper limit of the preferred concentration range) than $H_2$ gas is that $NH_3$ gas contains nitrogen and has the higher ability to nitride X element oxide and zirconium dioxide than $H_2$ gas.

The sintering temperature of the mixed powder is preferably within a range of 650° C. or higher and 900° C. or lower, and more preferably within a range of 700° C. or higher and 800° C. or lower. The reason why the preferred sintering temperature of the mixed powder is within the above-described range is as follows. Since 650° C. is a melting temperature of metallic magnesium, when the sintering temperature is lower than 650° C., X element oxide, oxide of yttrium, and zirconium dioxide may not be sufficiently reduced. On the other hand, even when the sintering temperature is higher than 900° C., the effect thereof is not increased, and thermal energy may be wasted, and sintering of the produced zirconium-containing nitride particles may proceed.

A sintering time of the mixed powder is preferably within a range of 30 minutes or longer and 90 minutes or shorter, and more preferably within a range of 30 minutes or longer and 60 minutes or shorter. In addition, a reaction chamber for sintering the mixed powder preferably has a lid so as to prevent raw materials or products from scattering during the reaction. This is because when the metallic magnesium starts to melt, the reduction of the X element oxide, the oxide powder of yttrium, and the zirconium dioxide proceeds rapidly, the temperature rises accordingly, and gas inside the chamber expands, and accordingly, the materials inside the chamber may scatter to the outside.

Next, the zirconium-containing nitride powder obtained by the above-described nitriding reaction is washed with an acid solution, and then neutralized. Specifically, the zirconium-containing nitride powder obtained by the nitriding reaction is taken out from the reaction chamber and finally cooled to room temperature. The resultant is washed with the acid solution such as aqueous hydrochloric acid solution. As a result, magnesium oxide produced by oxidation of metallic magnesium, and magnesium oxide or magnesium nitride contained from the beginning of the reaction to prevent sintering of the product are removed. The acid washing is preferably carried out under the conditions where pH of the acid solution is 0.5 or greater, particularly 1.0 or greater, and a temperature of the acid solution is 90° C. or lower. This is because when acidity of the acid solution becomes too strong or when the temperature of the acid solution becomes too high, even zirconium, X element, and yttrium in the zirconium-containing nitride powder may be eluted. After the acid washing, the pH is adjusted to be within a range of 5 to 6 by adding ammonia water or the like to obtain a black slurry. Further, the solid material is separated from the black slurry and dried to obtain a black material. Specifically, the solid material is separated by filtering or centrifuging the black slurry. The solid material is dried and then pulverized to obtain a black material (black pigment and zirconium-containing nitride powder).

<Second Production Method>

This production method is a method for producing zirconium-containing nitride powder (black material) by a thermal plasma method. Examples of a device for carrying out the thermal plasma method can include a thermal plasma device such as a high-frequency induction thermal plasma nanoparticle synthesis device (manufactured by JEOL Ltd., TP40020NPS). The thermal plasma device includes a raw material supply machine that supplies raw materials to a plasma torch, the plasma torch that is connected to the raw material supply machine and performs synthetic nitriding reaction on the raw materials by the thermal plasma method, an induction coil that is wound around an outer periphery of the plasma torch, a high-frequency power supply that is electrically connected to the induction coil to supply high-frequency power to the induction coil, a chamber that is connected to the plasma torch and allows cooling gas such as $N_2$ gas or Ar gas to flow inside, and a bag filter that is connected to the chamber to recover the zirconium-containing nitride powder.

In order to produce zirconium-containing nitride powder using the thermal plasma device, first, a raw metal powder containing metallic zirconium powder, X element metallic powder, and metallic yttrium powder, which is a raw material, is supplied to the raw material supply machine.

When producing zirconium-containing nitride containing no yttrium, a raw metal powder containing no metallic yttrium powder is used.

The metallic zirconium powder preferably has a purity of 98% or greater and an average primary particle size of 30 μm or less. The reason why the preferred average primary particle size of the metallic zirconium powder is 30 μm or less is that a high-purity zirconium-containing nitride powder can be easily obtained. On the other hand, when the average primary particle size exceeds 30 μm, the melting and gasification of the metallic zirconium powder become insufficient, and the metallic zirconium powder that is not nitrided is recovered as it is, so that it may be impossible to obtain zirconium-containing nitride powder exhibiting sufficient properties.

Further, the X element metallic powder preferably has a purity of 98% or greater and an average primary particle size of 1000 μm or less. In this case, the reason why the preferred purity of the X element metallic powder is 98% or greater is that when the purity is less than 98%, the purity of the obtained zirconium-containing nitride may be lowered and thus sufficient properties may not be obtained. In addition, the reason why the preferred average primary particle size of the X element metallic powder is 1000 μm or less is that when the average primary particle size exceeds 1000 μm, zirconium-containing nitride powder with a uniform composition may be hardly obtained.

The metallic yttrium powder preferably has a purity of 98% or greater and an average primary particle size of 1 μm) or greater and 1000 μm or less. When the average primary particle size of the metallic yttrium powder exceeds 1000 μm, zirconium-containing nitride powder with a uniform composition may be hardly obtained.

The average primary particle sizes of the metallic zirconium powder, the X element metallic powder, and the metallic yttrium powder are particle sizes (volume-based median sizes (D50)) measured using a laser diffraction/scattering particle size distribution analyzer (manufactured by Horiba, Ltd., LA-950), and are volume-based average primary particle sizes.

Next, the raw metal powder supplied to the raw material supply machine is introduced into the plasma torch together with a carrier gas such as $N_2$ gas or Ar gas. The inside of the plasma torch may be a $N_2$ gas atmosphere, a mixture gas atmosphere of $N_2$ and $H_2$, a mixture gas atmosphere of $N_2$ and Ar, or a mixture gas atmosphere of $N_2$ and $NH_3$. By supplying the high-frequency power from the high-frequency power supply to the induction coil, the gas including $N_2$ generates thermal plasma (plasma flame) of $N_2$ gas, thermal plasma of mixture gas of $N_2$ and $H_2$, thermal plasma of mixture gas of $N_2$ and Ar, or thermal plasma of mixture gas of $N_2$ and $NH_3$. Then, the raw metal powder introduced into the plasma torch is volatilized and gasified by thermal plasma of $N_2$ gas or the like at a high temperature of several thousand degrees, which is generated in the plasma torch. That is, a synthetic nitriding reaction occurs by the thermal plasma method. Next, the gasified raw material metal is rapidly cooled in the chamber through which the cooling gas such as $N_2$ gas or Ar gas flows. That is, the raw material metal is instantly cooled and condensed by the cooling gas such as $N_2$ gas or Ar gas in the chamber below the plasma torch. As a result, zirconium-containing nitride powder is produced. The produced zirconium-containing nitride powder is recovered by a bag filter. Thus, zirconium-containing nitride powder is obtained. The zirconium-containing nitride powder obtained as described above may be a nano-sized black material having an average primary particle size within a range of 10 nm or greater and 50 nm or less.

The average primary particle size of the black material (black pigment and zirconium-containing nitride powder) is a converted value (BET size) calculated by spherical conversion from a measured value of the specific surface area measured by the BET method.

According to the zirconium-containing nitride powder of the present embodiment configured as described above, the zirconium-containing nitride powder has a composition represented by General Formula (I) and contains a specific group 3 element represented by X, and thus the wavelength at which the maximum peak of the extinction coefficient in the visible light region is exhibited can be within a range of 540 nm or greater and 600 nm or less. Therefore, visible light from a short wavelength side (for example, wavelength of 400 nm) to a long wavelength side (for example, wavelength of 800 nm) can be shielded. Therefore, the zirconium-containing nitride powder of the present embodiment has excellent ultraviolet light transmittance and visible light shielding properties. In addition, when the zirconium-containing nitride powder of the present embodiment has an average particle size within a range of 10 nm or greater and 70 nm or less, plasma oscillation of zirconium-containing nitride particles due to visible light is less likely to be attenuated. Therefore, the visible light shielding properties are improved. In addition, since the particle size is sufficiently small with respect to the wavelength of light, light scattering is less likely to occur; and thereby, ultraviolet light transmittance at a wavelength of 365 nm is improved.

Further, in the zirconium-containing nitride powder of the present embodiment, when in the extinction coefficients measured by the above-described method, the ratio ($\alpha_{550}/\alpha_{365}$) of the extinction coefficient $\alpha_{550}$ of visible light at a wavelength of 550 nm to the extinction coefficient $\alpha_{365}$ of ultraviolet light at a wavelength of 365 nm is within a range of 1.4 or greater and 100 or less, the ultraviolet light transmittance and the visible light shielding properties are improved in a well-balanced manner. Therefore, by using the zirconium-containing nitride powder of the present embodiment, it is possible to form a black pattern having high definition and excellent visible light shielding properties. Furthermore, in the zirconium-containing nitride powder of the present embodiment, when the extinction coefficient of visible light at the wavelength 550 nm is equal to or greater than 600 $m^{-1}$, the visible light shielding properties are further improved. Therefore, the black pattern formed using the zirconium-containing nitride powder of the present embodiment is useful as a black matrix of color filters for display and a light shielding material in CMOS camera modules.

In the zirconium-containing nitride powder of the present embodiment, when the ratio ($\alpha_{550}/\alpha_{365}$) is within a range of 1.4 or greater and 100 or less, the composition thereof is not necessarily represented by General Formula (I).

(Ultraviolet Ray-Curable Black Organic Composition)

For example, a black pattern is used as a black matrix of an image forming element and a light shielding material in a CMOS camera module. The above-described zirconium-containing nitride powder can be used as a raw material of the ultraviolet ray-curable black organic composition for forming the black pattern.

The ultraviolet ray-curable black organic composition includes an ultraviolet ray-curable organic material and a black pigment dispersed in the ultraviolet ray-curable organic material. As the black pigment, the zirconium-containing nitride powder described above is used.

Examples of the ultraviolet ray-curable organic material can include acrylic acid ester, methacrylic acid ester, glycidyl ether, glycidyl amine, glycidyl ester, and the like. In addition, as the ultraviolet ray-curable organic material, a monomer or an oligomer, which is subjected to polymerization by irradiation of ultraviolet rays to generate a polymer can be used. Examples of the ultraviolet ray-curable organic material can include an acrylic monomer, an acrylic oligomer, an epoxy monomer, and an epoxy oligomer. One of these organic materials may be used or a combination of two or more thereof may also be used.

The acrylic monomer is a monomer having a (meth)acryloyl group. The (meth)acryloyl group includes an acryloyl group and a methacryloyl group. The acrylic monomer may be a monofunctional acrylic monomer having one (meth)acrylic group in one molecule, or a polyfunctional acrylic monomer having two or more (meth)acrylic groups in one molecule. Examples of the monofunctional (meth)acrylic monomer include (meth)acrylic acid, methyl(meth)acrylate, ethyl(meth)acrylate, propyl(meth)acrylate, n-butyl(meth)acrylate, isobutyl(meth)acrylate, 2-ethylhexyl(meth)acrylate, octyl(meth)acrylate, isooctyl(meth)acrylate, isodecyl(meth)acrylate, lauryl(meth)acrylate, stearyl(meth)acrylate, benzyl(meth)acrylate, phenyl(meth)acrylate, phenoxyethyl(meth)acrylate, 2-hydroxy ethyl(meth)acrylate, 2-hydroxypropyl(meth)acrylate, isoamyl acrylate, tetrahydrofurfuryl(meth)acrylate, isobornyl(meth)acryl ate, and the like. Examples of the bifunctional (meth)acrylic monomers include 1,6 hexanediol di(meth)acrylate, 1,9 nonanediol di(meth)acrylate, neopentyl glycol di(meth)acrylate, polyethylene glycol di(meth)acrylate, ethylene oxide-modified bisphenol A di(meth)acrylate, neopentyltriethylene glycol di(meth)acrylate, and the like. Examples of the polyfunctional (meth)acrylic monomer include pentaerythritol tri(meth)acrylate, pentaerythritol tetra(meth)acrylate, and trimethylolpropane tri(meth)acrylate.

The acrylic oligomer is a low molecular weight polymer obtained by polymerizing the acrylic monomer, and examples thereof include acrylic acrylate, urethane acrylate, epoxy acrylate, polyester acrylate, and the like. The molecular weight of the acrylic oligomer may be, for example, within a range of 1000 or greater and 10000 or less in terms of number average molecular weight. One of the (meth)acrylate monomer and oligomer may be used or a combination of two or more thereof may also be used. In addition, the (meth)acrylic monomer and oligomer are not limited to those described above, and commonly available (meth)acrylic monomer and oligomer can be used.

The epoxy monomer has an epoxy group. The epoxy monomer may be a monofunctional epoxy monomer having one epoxy group in one molecule, or a polyfunctional epoxy monomer having two or more epoxy groups in one molecule. Examples of the epoxy monomer include glycidyl ether, cycloaliphatic epoxy, and the like.

The epoxy oligomer is low molecular weight polymer obtained by polymerizing the epoxy monomer. The molecular weight of the epoxy oligomer may be, for example, within a range of 1000 or greater and 10000 or less in terms of number average molecular weight.

The ultraviolet ray-curable black organic composition may include other ultraviolet ray-curable organic materials. Examples of other ultraviolet ray-curable organic materials can include styrene-based monomers, vinyl-based monomers, cationic curable monomers, and the like. Examples of the styrene-based monomers include styrene, vinyltoluene, and divinylbenzene. Examples of the vinyl-based monomers include vinyl chloride and vinyl acetate. Examples of the cationic curable monomers include oxetanes.

The ultraviolet ray-curable black organic composition may include a photopolymerization initiator. The photopolymerization initiator is preferably a compound capable of absorbing ultraviolet rays, specifically light at a wavelength of 100 to 400 nm, and initiating the polymerization reaction. Examples of the photopolymerization initiator include benzophenone, azobisisobutyl ether, benzoyl peroxide, bis(4-tert-butyl phenyl)iodonium hexafluorophosphate, triphenylsulfonium tetrafluoroborate, tri-p-tolylsulfonium trifluoromethanesulfonate, and the like.

The amount of the ultraviolet ray-curable organic material is preferably within a range of 50 mass % or greater and 90 mass % or less with respect to the solid amount of the ultraviolet ray-curable black organic composition. When the amount of the ultraviolet ray-curable organic material is within this range, shielding properties of the obtained black pattern tends to be improved. The amount of the ultraviolet ray-curable organic material is more preferably within a range of 55 mass % or greater and 85 mass % or less, and particularly preferably within a range of 60 mass % or greater and 80 mass % or less.

The amount of the photopolymerization initiator is preferably within a range of 0.5 mass % or greater and 15 mass % or less with respect to the ultraviolet ray-curable organic material.

The amount of the zirconium-containing nitride powder is preferably within a range of 0.1 mass % or greater and 50 mass % or less with respect to the solid amount of the ultraviolet ray-curable black organic composition. When the amount of the zirconium-containing nitride powder is within this range, the visible light shielding properties and the transmittance of ultraviolet rays can be improved in a well-balanced manner The lower limit of the amount of the zirconium-containing nitride powder is preferably 5 mass % or greater, preferably 10 mass % or greater, and particularly preferably mass % or greater. The upper limit of the amount of the zirconium-containing nitride powder is preferably 45 mass % or less, and more preferably 40 mass % or less.

The ultraviolet ray-curable black organic composition may include a solvent. Examples of the solvent can include propylene glycol monomethyl ether acetate (PGM-Ac), ethanol, toluene, water, and the like. The amount of the solvent is preferably within a range of 0 mass % or greater and 60 mass % or less with respect to the ultraviolet ray-curable black organic composition. When the amount of the solvent is within this range, coatability of the ultraviolet ray-curable black organic composition is improved, and a thickness of a photoresist film formed on a substrate tends to be uniform. The amount of the solvent is more preferably within a range of 5 mass % or greater and 50 mass % or less, and particularly preferably within a range of 10 mass % or greater and 40 mass % or less.

An ultraviolet ray-curable black organic composition can be prepared by, for example, mixing the zirconium-containing nitride powder, the ultraviolet ray-curable organic material, and the solvent. With regard to the order of mixing, the zirconium-containing nitride powder, the ultraviolet ray-curable organic material, and the solvent may be mixed at the same time, the solvent may be added to a mixture of the zirconium-containing nitride powder and the ultraviolet ray-curable organic material and mixed, the ultraviolet ray-curable organic material may be added to a mixture of the zirconium-containing nitride powder and the solvent and mixed, or the zirconium-containing nitride powder may be added to a mixture of the ultraviolet ray-curable organic material and the solvent and mixed.

Since the ultraviolet ray-curable black organic composition configured as described above includes the zirconium-containing nitride powder of the present embodiment, excellent ultraviolet light transmittance and excellent visible light shielding properties can be obtained. Therefore, by using the above-described ultraviolet ray-curable black organic composition, it is possible to form a high-definition black pattern by a photolithography method using ultraviolet light. In addition, the obtained black pattern has excellent visible light shielding properties.

(Method for Forming Black Pattern)

A photolithography method using ultraviolet light can be used as a method for forming a black pattern using the above-described ultraviolet ray-curable black organic composition. The method for forming a black pattern using the photolithography method includes, for example, a coating step, an exposing step, a washing step, and a heating step.

The coating step is a step of coating the ultraviolet ray-curable black organic composition on a substrate to form a photoresist film. In a case where the ultraviolet ray-curable black organic composition contains the solvent, the ultraviolet ray-curable black organic composition may be coated and then heated to remove the solvent. Examples of the substrate can include glass, silicon, polycarbonate, polyester, aromatic polyamide, polyamideimide, polyimide, and the like. In addition, if desired, the substrate may be subjected to appropriate pretreatments such as a chemical treatment with a silane coupling agent, plasma treatment, ion plating, sputtering, a vapor phase reaction method, vacuum deposition, and the like. As the coating method of the ultraviolet ray-curable black organic composition, a spin coating method, a cast coating method, a roll coating method, a dipping method, or the like can be used. A thickness of the photoresist film is usually within a range of 0.1 μm or greater and 10 μin or less, preferably within a range of 0.2 μin or greater and 7.0 μm or less, and particularly preferably within a range of 0.5 μm or greater and 6.0 μm or less.

The exposing step is a step of exposing ultraviolet light to the photoresist film in a pattern to form a pattern including a cured portion that is exposed to the ultraviolet light and an uncured portion that is not exposed to the ultraviolet light. As the method for exposing ultraviolet light in a pattern, a method using a photomask and a method for radiating ultraviolet light in a pattern can be used. As the ultraviolet light, ultraviolet light (i rays) at a wavelength of 365 nm can be used.

The washing step is a step of removing the uncured portion that is not exposed to the light using a washing liquid. An alkaline aqueous solution can be used as the washing liquid. Examples of the washing method can include an immersion method, a shower washing, a spray washing, and an ultrasonic washing.

The heating step is a step of heating the cured portion that is dried after the washing step to further cure the cured portion. A heating temperature is, for example, within a range of 100° C. or higher and 300° C. or lower. The heating step may be omitted in a case where the cured portion formed by the exposing step has a sufficient hardness.

Since the black material including the zirconium-containing nitride powder of the present embodiment is used in the method for forming a black pattern configured as described above, it is possible to form a high-definition black pattern. In addition, the obtained black pattern has excellent visible light shielding properties.

EXAMPLES

Test Example 1

Five samples of zirconium nitride (ZrN) powder having particle sizes of 20 nm, nm, 60 nm, 80 nm, and 100 nm were assumed. A dielectric constant for each assumed zirconium-containing nitride particle was calculated by performing first-principles calculation. Mie scattering calculation of each zirconium-containing nitride particles was performed using the obtained dielectric constant to calculate an extinction power $Q_{ext}$ of one particle. Then, a wavelength-extinction coefficient curve of a dispersion containing 50 mass ppm of each zirconium-containing nitride powder was calculated. The results are shown in FIG. 1. In addition, the following Table 1 shows a ratio ($\alpha_{550}/\alpha_{365}$) of an extinction coefficient $\alpha_{550}$ of visible light at a wavelength of 550 nm to an extinction coefficient $\alpha_{365}$ of ultraviolet light at a wavelength of 365 nm.

TABLE 1

| | Average particle size of zirconium nitride powder (nm) | | | | |
|---|---|---|---|---|---|
| | 100 | 80 | 60 | 40 | 20 |
| Extinction coefficient ($\alpha_{550}$) of visible light at wavelength of 550 nm | 700 | 859 | 671 | 424 | 312 |
| Extinction coefficient ($\alpha_{365}$) of ultraviolet light at wavelength of 350 nm | 133 | 130 | 122 | 112 | 104 |
| Ratio ($\alpha_{550}/\alpha_{365}$) | 5.24 | 6.60 | 5.50 | 3.78 | 2.96 |

From the wavelength-extinction coefficient curve in FIG. 1, it can be seen that as the particle size of the zirconium nitride powder decreases from 100 nm to 40 nm, a maximum extinction coefficient value in the visible light region increases, and the maximum extinction coefficient values in the visible light region when the particle sizes are 40 nm and 20 nm are almost the same. In addition, it can be seen that as the particle size decreases, the wavelength at which the maximum peak of the extinction coefficient in the visible light region is exhibited becomes shorter, and the extinction coefficient of visible light on the long wavelength side decreases. This is because the wavelength of plasmon resonance shortens as the particle size decreases.

Test Example 2

Zirconium-containing nitride ($Zr_{0.875}X_{0.125}N$) particles in which ⅛ of Zr atoms of zirconium nitride (ZrN) were substituted with other elements X were assumed. Element X was Na, K, Rb, Cs, Mg, Ca, Sr, Ba, Sc, Ti, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, P, As, Sb, Bi, S, Se, Te, Po, La, Ce, Pr, Nd, Sm, Eu, Gd, Tb, Dy, Ho, Er, Tm, Yb, and Lu. In addition, zirconium-containing nitride ($Zr_{0.875}Y_{0.0625}DY_{0.0625}N$) particles obtained by substituting a part of Zr atoms of zirconium nitride (ZrN) with Y and Dy were assumed. The zirconium-containing nitride particles had five particle sizes of 20 nm, 40 nm, 60 nm, nm, and 100 nm.

Figure 2:
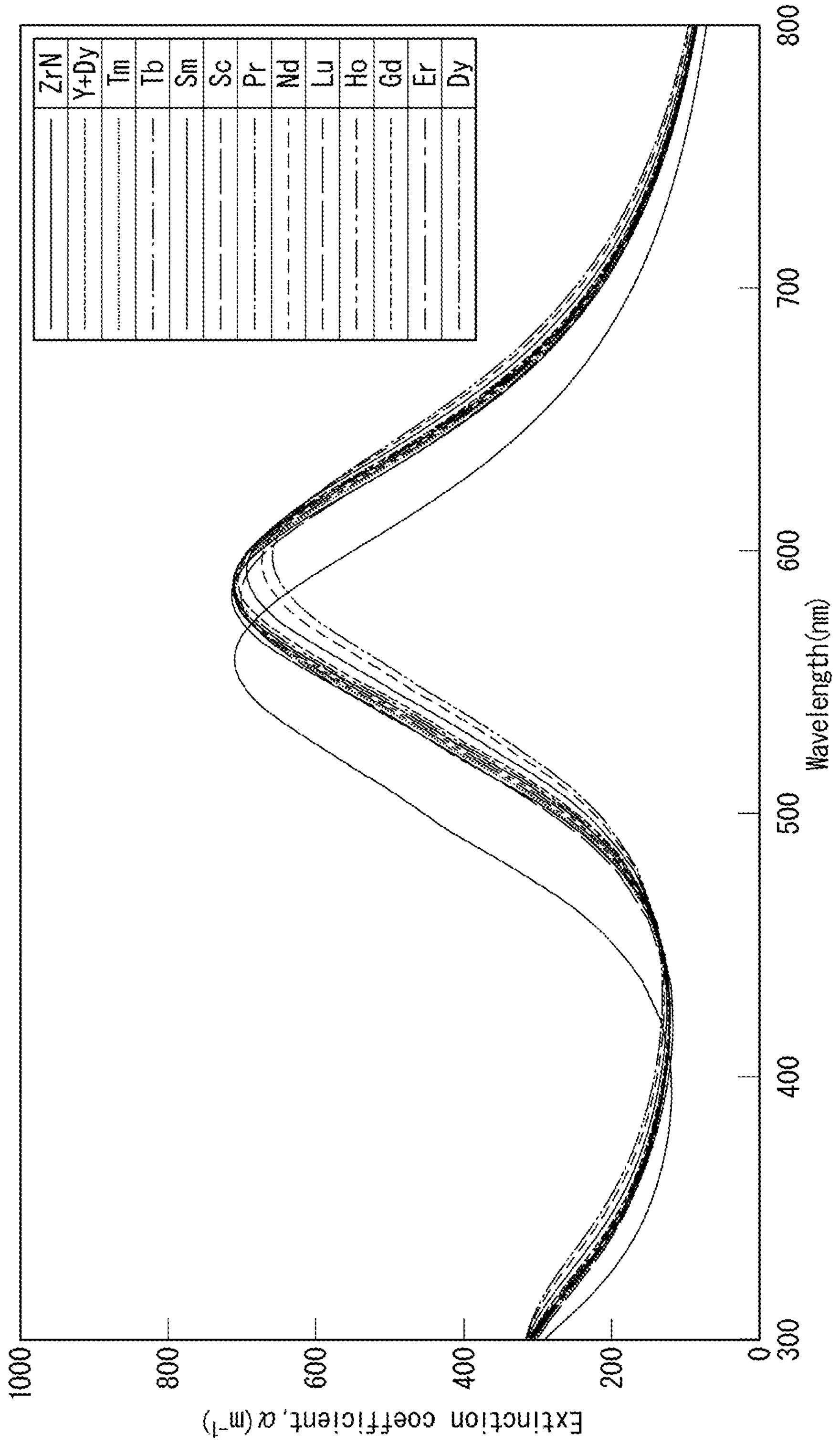
FIG. 2 shows wavelength-extinction coefficient curves of zirconium-containing nitride powders each substituted with Dy, Er, Gd, Ho, Lu, Nd, Pr, Sc, Sm, Tb, Tm, or Y+Dy, which are calculated in Test Example 2.

A wavelength-extinction coefficient curve for each assumed zirconium-containing nitride particle was calculated in the same manner as in Test Example 1. As a result, it can be seen that the group 3 elements Dy, Er, Gd, Ho, Lu, Nd, Pr, Sc, Sm, Tb, Tm, and Y+Dy have an effect of shifting the wavelength, at which the maximum peak of the extinction coefficient in the visible light region is exhibited, to the long wavelength side. FIG. 2 shows wavelength-extinction coefficient curves of zirconium-containing nitride (particle size: 100 nm) obtained by substituting a part of Zr with Dy, Er, Gd, Ho, Lu, Nd, Pr, Sc, Sm, Tb, Tm, or Y+Dy.

From the wavelength-extinction coefficient curves in FIG. 2, it can be seen that with regard to the zirconium-containing nitride obtained by substituting a part of Zr with Dy, Er, Gd, Ho, Lu, Nd, Pr, Sc, Sm, Tb, Tm, or Y+Dy, the wavelength at which the maximum peak of the extinction coefficient in the visible light region is exhibited is 580 nm or greater, and the maximum peak of the extinction coefficient in the visible light region shifts to the long wavelength side as compared with zirconium nitride.

From the results of Test Examples 1 and 2, it can be seen that when the average particle size of the zirconium nitride powder is reduced, and a part of Zr is substituted with the group 3 elements such as Dy, Er, Gd, Ho, Lu, Nd, Pr, Sc, Sm, Tb, Tm, and Y+Dy, it is possible to obtain zirconium-containing nitride powder having excellent ultraviolet light transmittance and visible light shielding properties.

Test Example 3

Figure 3:
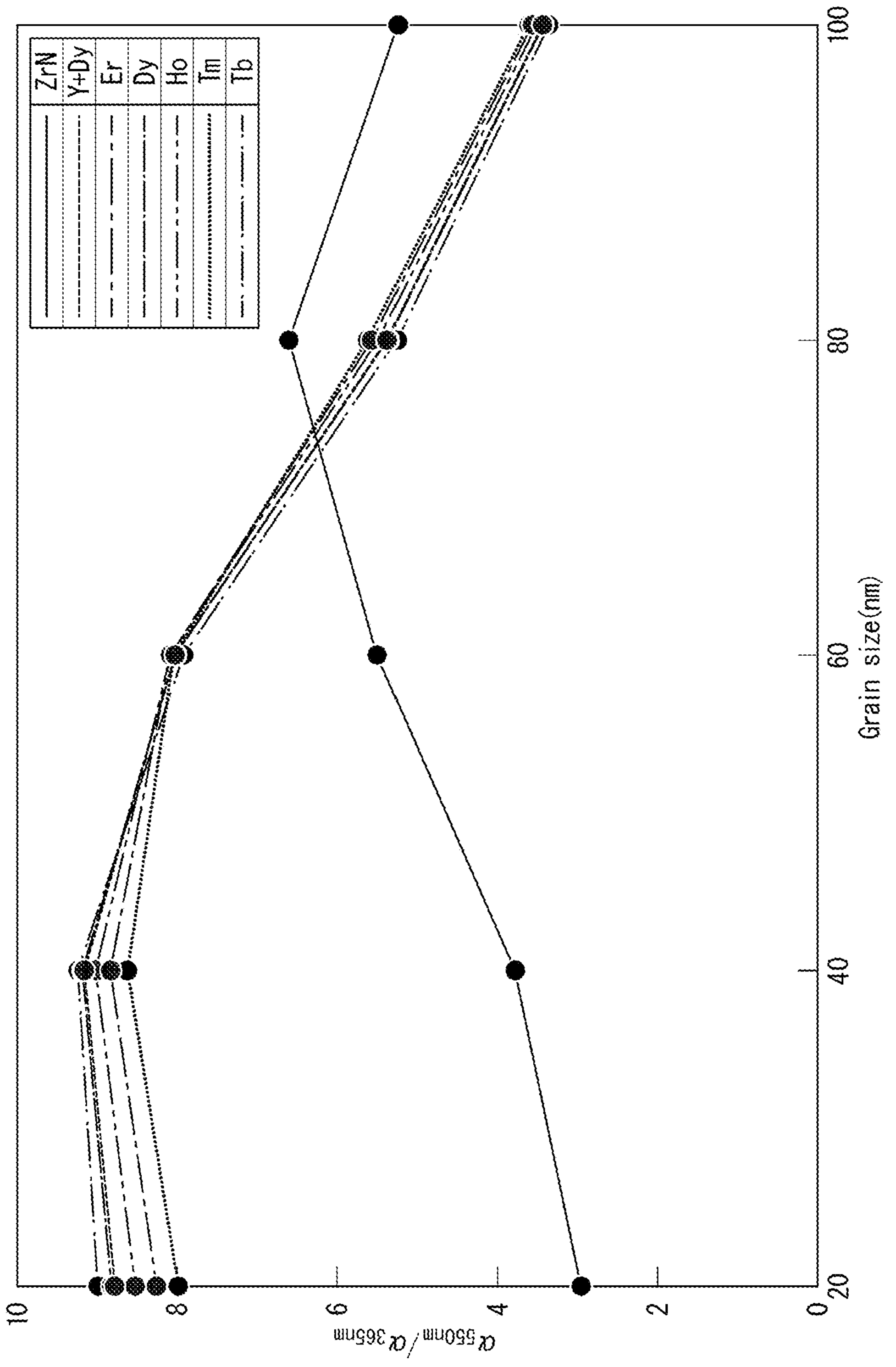
FIG. 3 shows a graph showing a relationship between a particle size and a ratio ($\alpha_{550}/\alpha_{365}$) of an extinction coefficient $\alpha_{550}$ of visible light at a wavelength of 550 nm to an extinction coefficient $\alpha_{365}$ of ultraviolet light at a wavelength of 365 nm, in zirconium nitride powders assumed in Test Example 1 and the zirconium-containing nitride powders substituted with Dy, Er, Ho, Tb, Tm, or Y+Dy assumed in Test Example 2.

For the zirconium-containing nitride particles assumed in Test Example 2 (particle sizes: 20 nm, 40 nm, 60 nm, 80 nm, and 100 nm), a ratio ($\alpha_{550}/\alpha_{365}$) of an extinction coefficient $\alpha_{550}$ of visible light at a wavelength of 550 nm to an extinction coefficient $\alpha_{365}$ of ultraviolet light at a wavelength of 365 nm was calculated. FIG. 3 shows a relationship between the particle size of the zirconium-containing nitride particles and the ratio ($\alpha_{550}/\alpha_{365}$) together with the result of zirconium nitride (ZrN) powder obtained in Test Example 1.

In the graph of FIG. 3, a horizontal axis indicates a particle size, and a vertical axis indicates a ratio ($\alpha_{550}/\alpha_{365}$). From the results of FIG. 3, it can be seen that when the particle size is 70 nm or less, the ratio ($\alpha_{550}/\alpha_{365}$) of the zirconium-containing nitride powder becomes larger than that of the zirconium nitride powder.

Invention Example 1

Zirconium dioxide powder and dysprosium oxide powder were weighed such that a molar ratio of zirconium to dysprosium was 0.875:0.125 and the total mass was 10 g. The weighed zirconium dioxide powder and dysprosium oxide powder were uniformly mixed using a mixer. 7.86 g of the obtained dysprosium oxide-containing zirconium oxide powder, 5.83 g of metallic magnesium powder, and 3.39 g of magnesium oxide powder were mixed in a nitrogen atmosphere to prepare a mixed powder. In the obtained mixed powder, the amount of the metallic magnesium powder was 4.0 times mol in terms of a mass ratio with respect to metal atoms in the dysprosium oxide-containing zirconium oxide powder. In addition, the amount of magnesium atoms in the magnesium oxide powder was 1.4 times mol in terms of the mass ratio with respect to metal atoms in the dysprosium oxide-containing zirconium oxide powder. The mixed powder was sintered at a temperature of 700° C. for 60 minutes in a nitrogen gas atmosphere to obtain a sintered product. The obtained sintered product was dispersed in 1 liter of water, and 17.5% hydrochloric acid was gradually added thereto so as to perform washing while maintaining pH within a range of 1 or higher and the temperature within a range of 100° C. or lower. Then pH of the resultant was adjusted to be within a range of 7 to 8 by adding 25% ammonia water and the resultant was filtered. The filtered solid material was re-dispersed in water at a concentration of 400 g/liter, acid washing and pH adjustment with ammonia water were conducted again in the same manner as described above. The resultant was then filtered. In this way, acid washing and pH adjustment with ammonia water were repeated twice. Next, the filtrate was dispersed in ion-exchanged water at a concentration of 500 g/liter in terms of solid amount, heated and stirred at 60° C., and pH was adjusted to 7. Then, the resultant was filtered with a suction filtration device, washed with an equal amount of ion-exchanged water, and dried with a hot air dryer of which a temperature was set to 120° C. The obtained dried powder was subjected to X-ray diffraction pattern measurement and elemental analysis using X-ray photoelectron spectroscopy (XPS). In addition, the amount of oxygen was measured by a method conforming to JIS Z2613 "General Rules for Determination of Oxygen in Metal Materials". The nitrogen amount was measured by an inert gas fusion-thermal conductivity method. As a result, it was confirmed that the obtained dried powder was zirconium-containing nitride powder containing dysprosium represented by General Formula (II). The average particle size of the obtained zirconium-containing nitride powder was 50 nm.

Invention Example 2

Zirconium-containing nitride powder was produced in the same manner as in Invention Example 1, except that erbium oxide powder, gadolinium oxide powder, holmium oxide powder, lutetium oxide powder, neodymium oxide powder, praseodymium oxide powder, scandium oxide powder, samarium oxide powder, terbium oxide powder, and thulium oxide powder were used instead of the dysprosium oxide powder. The obtained zirconium-containing nitride powder contained each of the used group 3 elements.

INDUSTRIAL APPLICABILITY

The zirconium-containing nitride powder of the present embodiment has excellent ultraviolet light transmittance and visible light shielding properties. Therefore, the zirconium-containing nitride powder of the present embodiment is preferably applied as a material for black patterns that constitute black matrices of a color filter for display and light shielding materials in CMOS camera modules.

What is claimed is:

1. Zirconium-containing nitride powder having a composition represented by the following General Formula (I), $$(Zr, X, Y)(N, O) \quad (I)$$

in General Formula (I), X represents at least one element selected from the group consisting of Dy, Er, Gd, Ho, Lu, Nd, Pr, Sc, Sm, Tb, and Tm, Y represents an element symbol of yttrium, an amount of Y is 0 mol or greater with respect to 1 mol of a total amount of Zr, X, and Y, N represents nitrogen, O represents oxygen, and an amount of oxygen is 0 mol or greater with respect to 1 mol of a total amount of nitrogen and oxygen, wherein in extinction coefficients measured by the following method, a ratio of an extinction coefficient of visible light at a wavelength of 550 nm to an extinction coefficient of ultraviolet light at a wavelength of 365 nm is within a range of 1.4 or greater and 100 or less, (method for measuring extinction coefficient)

a dispersion containing the zirconium-containing nitride powder at a mass concentration of 50 ppm is put into a cell having an optical path length d (unit: m), the cell containing the dispersion is irradiated with light to measure transmission light intensity of the light transmitted through the cell, and α is calculated as an extinction coefficient of the light irradiated into the cell by substituting the optical path length d, incident light intensity $I_0$ of the light irradiated into the cell, and transmission light intensity I of the light transmitted through the cell into the following Equation (1), $$I=I_0\exp(-\alpha\times d) \quad (1)$$

2. The zirconium-containing nitride powder according to claim 1, wherein an average particle size is within a range of 10 nm or greater and 70 nm or less.

3. An ultraviolet ray-curable black organic composition comprising:

an ultraviolet ray-curable organic material; and a black pigment dispersed in the ultraviolet ray-curable organic material, wherein the black pigment is the zirconium-containing nitride powder according to claim 2.

4. The ultraviolet ray-curable black organic composition according to claim 3, wherein the ultraviolet ray-curable organic material is at least one organic material selected from the group consisting of an acrylic monomer, an acrylic oligomer, an epoxy monomer, and an epoxy oligomer.

5. The zirconium-containing nitride powder according to claim 1, wherein the extinction coefficient of visible light at the wavelength of 550 nm is equal to or greater than 600 $m^{-1}$.

6. An ultraviolet ray-curable black organic composition comprising:

an ultraviolet ray-curable organic material; and a black pigment dispersed in the ultraviolet ray-curable organic material, wherein the black pigment is the zirconium-containing nitride powder according to claim 5.

7. The ultraviolet ray-curable black organic composition according to claim 6, wherein the ultraviolet ray-curable organic material is at least one organic material selected from the group consisting of an acrylic monomer, an acrylic oligomer, an epoxy monomer, and an epoxy oligomer.

8. An ultraviolet ray-curable black organic composition comprising:

an ultraviolet ray-curable organic material; and a black pigment dispersed in the ultraviolet ray-curable organic material, wherein the black pigment is the zirconium-containing nitride powder according to claim 1.

9. The ultraviolet ray-curable black organic composition according to claim 8, wherein the ultraviolet ray-curable organic material is at least one organic material selected from the group consisting of an acrylic monomer, an acrylic oligomer, an epoxy monomer, and an epoxy oligomer.

10. Zirconium-containing nitride powder having an average particle size within a range of nm or greater and 70 nm or less, wherein in extinction coefficients measured by the following method, a ratio of an extinction coefficient of visible light at a wavelength of 550 nm to an extinction coefficient of ultraviolet light at a wavelength of 365 nm is within a range of 1.4 or greater and 100 or less, (method for measuring extinction coefficient)

a dispersion containing the zirconium-containing nitride powder at a mass concentration of 50 ppm is put into a cell having an optical path length d (unit: m), the cell containing the dispersion is irradiated with light to measure transmission light intensity of the light transmitted through the cell, and α is calculated as an extinction coefficient of the light irradiated into the cell by substituting the optical path length d, incident light intensity $I_0$ of the light irradiated into the cell, and transmission light intensity I of the light transmitted through the cell into the following Equation (1), $$I=I_0\exp(-\alpha\times d) \quad (1).$$

11. An ultraviolet ray-curable black organic composition comprising:

an ultraviolet ray-curable organic material; and a black pigment dispersed in the ultraviolet ray-curable organic material, wherein the black pigment is the zirconium-containing nitride powder according to claim 10.

12. The ultraviolet ray-curable black organic composition according to claim 11, wherein the ultraviolet ray-curable organic material is at least one organic material selected from the group consisting of an acrylic monomer, an acrylic oligomer, an epoxy monomer, and an epoxy oligomer.

* * * * *